United States Patent [19]

Kawamura

[11] Patent Number: 4,821,194
[45] Date of Patent: Apr. 11, 1989

[54] CYLINDER COMBUSTION MONITORING APPARATUS

[75] Inventor: Yoshihisa Kawamura, Yokosuka, Japan

[73] Assignee: Nissan Motor Company, Limited, Yokohama, Japan

[21] Appl. No.: 917,893

[22] Filed: Oct. 10, 1986

[30] Foreign Application Priority Data

| Oct. 22, 1985 | [JP] | Japan | 60-235811 |
| Oct. 22, 1985 | [JP] | Japan | 60-235812 |
| Oct. 22, 1985 | [JP] | Japan | 60-235813 |
| Oct. 22, 1985 | [JP] | Japan | 60-235814 |

[51] Int. Cl.$^4$ .......................... F02P 5/15; F02P 11/00
[52] U.S. Cl. .......................... 364/431.08; 123/425; 123/479; 73/35
[58] Field of Search .......................... 364/431.08, 431.11; 123/425, 435, 479; 73/35

[56] References Cited

U.S. PATENT DOCUMENTS

| 4,131,097 | 12/1978 | Sawada et al. | 123/425 |
| 4,153,019 | 5/1979 | Laubenstein et al. | 123/425 |
| 4,164,867 | 8/1979 | Hickling et al. | 73/35 X |
| 4,356,551 | 10/1982 | Iwase et al. | 123/425 X |
| 4,357,919 | 11/1982 | Hattori et al. | 123/425 |
| 4,428,344 | 1/1984 | Focht | 73/35 X |
| 4,446,724 | 5/1984 | Focht | 73/35 |
| 4,462,362 | 7/1984 | Bonitz et al. | 123/425 |
| 4,660,535 | 4/1987 | Asano | 123/425 |
| 4,690,116 | 9/1987 | Takahashi | 364/431.08 X |

OTHER PUBLICATIONS

M. Kondo et al., "Isdiscope—A New Combustion Pressure Indicator with Washer Transducers", Society of Automotive Engineers, Inc., 1975.

*Primary Examiner*—Parshotam S. Lall
*Assistant Examiner*—V. N. Trans
*Attorney, Agent, or Firm*—Foley & Lardner, Schwartz, Jeffery, Schwaab, Mack, Blumenthal & Evans

[57] ABSTRACT

An apparatus for monitoring cylinder combustion in an internal combustion engine having at least one cylinder to control the engine by employing a pressure sensor sensitive to combustion pressure in the cylinder for producing a sensor signal indicative of a sensed cylinder combustion pressure level. From the sensor signal, there are extracted a knock signal in a predetermined high frequency range and a cylinder combustion pressure signal in a predetermined low frequency range. The apparatus includes an electrical circuit which provides a first indication in response to an abnormal condition of the high frequency knock signal and a second indication in response to an abnormal condition of the low frequency cylinder combustion pressure signal. The circuit provides a failure indication of the sensor signal being unreliable for use in controlling the engine in the presence of the first and/or second indications. The engine is controlled independently of the sensor signal upon occurrence of the failure indication.

12 Claims, 14 Drawing Sheets

CYLINDER COMBUSTION MONITORING APPARATUS

BACKGROUND OF THE INVENTION

This invention relates to an apparatus employing a cylinder combustion pressure sensor to monitor cylinder combustion in an internal combustion engine.

In order to achieve high engine performance and high fuel economy, it is desired to control the engine in a manner to establish optimum cylinder combustion. For this purpose, it is the current practice to monitor cylinder combustion by employing a cylinder combustion pressure sensor which is secured to the engine by a spark plug or cylinder head bolt tightened to rated torque so as to produce a sensor signal indicative of a sensed cylinder combustion pressure level to a control circuit. In the event of engine misfire or failure of the cylinder pressure sensor and the associated signal line, however, the sensor signal become unreliable, causing the control circuit to control the engine toward undesirable cylinder combustion resulting in poor engine performance.

SUMMARY OF THE INVENTION

A main object of the invention is to provide a cylinder combustion monitoring apparatus which can provide a failure indication of the sensor signal being unreliable for use in controlling the engine;

It is another object of the invention to provide a cylinder combustion monitoring apparatus which can control the engine independently of the sensor signal upon occurrence of the failure indication.

It it still another object of the invention to provide a cylinder combustion monitoring apparatus which can indicate a cause of the failure indication to urge an operator to revmove the cause.

There is provided, in accordance with the invention, an apparatus for monitoring cylinder combustion in an internal combustion engine having at least one cylinder. The apparatus comprises a sensor means sensitive to combustion pressure in said cylinder for providing a sensor signal indicative of a sensed cylinder combustion pressure level. The sensor means is coupled through a signal line to a means for extracting, from the sensor signal, a knock signal in a predetermined high frequency range and a cylinder combustion pressure signal in a predetermined low frequency range. The appratus also includes a circuit responsive to the high frequency knock signal and the low frequency cylinder combustion pressure signal for providing a failure indication of the sensor signal being unreliable for use in controlling the engine. The circuit includes a first decision means responsive to an abnormal condition of the high frequency knock signal for providing a first indication, a second decision means responsive to an abnormal condition of the low frequency cylinder combustion pressure signal for providing a second indication, and a means for providing the failure indication based upon the first and second indications. A means is provided for controlling the engine independently of the sensor signal in response to the failure indication.

BRIEF DESCRIPTION OF THE DRAWINGS

The invention will be described in greater detail by reference to the following description taken in connection with the accompanying drawings, in which.

DETAILED DESCRIPTION OF THE INVENTION

Figure 1:
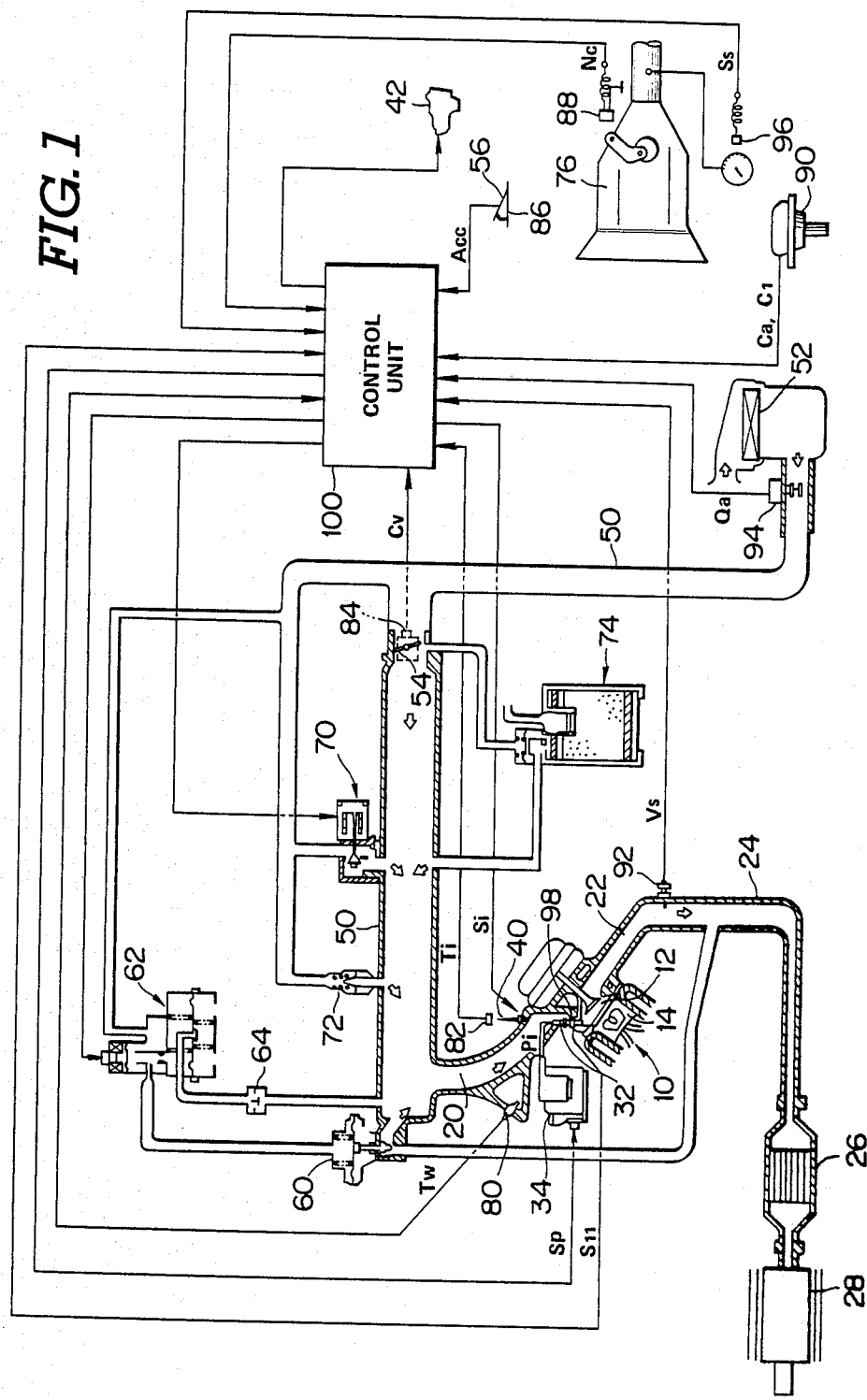
FIG. 1 is a schematic diagram of one embodiment of a cylinder combustion monitoring apparatus made in accordance with the invention.

With reference to the drawings, wherein like numerals refer to like parts in the several views, and in particular to FIG. 1, there is shown a schematic diagram of an engine control system embodying the apparatus of the invention. An internal combustion engine, generally designated by the numberal 10, for an automotive vehicle includes a combustion chamber or cylinder 12. A piston 14 is mounted for reciprocal motion within the cylinder 12. A crankshaft (not shown) is supported to reciprocation within the engine 10 in response to reciprocation of the piston 14 within the cylinder 12.

An intake manifold 20 is connected with the cylinder 12 through an intake port wiht which an intake valve is in cooperation for regulating the entry of combustion ingredients into the cylinder 12 from the intake manifold 20. A spark plug 32 is mounted in the top of the cylinder 12 for igniting the combustion ingredients within the cylinder 12 when the spark plug 32 is energized by the presence of high voltage electrical energy Pi from an ignition coil 34. An exhaust manifold 22 is connected with the cylinder 12 through an exhaust port with which an exhaust valve is in cooperation for regulating the exit of combustion products, exhaust gases, from the cylinder 12 into the exhaust manifold 22. The intake and exhaust valves are driven through a suitable linkage with the crankshaft.

A fuel injector 40 is connected to a fuel pump 42 which is also connected to a fuel tank (not shown). The fuel pump 42 is electrically operated to maintain sufficient pressure. The fuel injector 40 opens to inject fuel into the intake manifold 12 when it is energized by the presence of electrical current Si. The length of the electrical pulse, that is, the pulse-width, applied to the fuel injector 40 determines the length of time the fuel injector opens and, thus, determines the amount of fuel injected into the intake manifold 20. Air to the engine 10 is supplied through an air cleaner 52 into an induction passage 50. The amount of air permitted to enter the combustion chamber through the intake manifold 20 is controlled by a butterfly throttle valve 54 suitable within the induction passage 50. The throttle valve 54 is connected by a mechanical linkage to an accelerator pedal 56. The degree to which the accelerator pedal 56 is depressed controls the degree of rotation of the throttle valve 54. The accelerator pedal 54 is manually controlled by the operator of the engine control system.

In the operation of the engine 10, fuel is injected through the fuel injector 40 into the intake manifold 20 and mixed with the air therein. The engine is of the conventional four-cycle type. When the intake valve opens, the air-fuel mixture enters the combustion chamber 12. An upward stroke of the piston 14 compresses the air-fuel mixture, which is then ignited by a sprak produced by the spark plug 30 in the combustion chamber 12. Combustion of the air-fuel mixture in the combustion chamber 12 takes place, releasing heat energy, which is converted into mechanical energy upon the power stroke of the piston 14. At or near the end of the power stroke, the exhaust valve opens and the exhaust gases are discharged inot the exhaust manifold 22.

Most of the exhaust gases are discharged to the atmosphere through an exhaust system which includes an exhaust pipe 24, a catalytic converter 26 and a muffler 28. Some of the exhaust gases are recirculated to the combustion chamber 12 through an exhaust gas recirculation (EGR) system. This EGR system is constructed of the conventional parts of an EGR valve 60, a VCM valve 62 and a check valve 64. The VCM valve 62 determines the position of the EGR valve 60 and, thus, determines the amount of exhaust gases recirculated to the combustion chamber 12.

An AAC valve 70 is provided to control the amount of air introduced into the induction passage 50 through a passage bypassing the throttle valve 54 at idle conditions where the throttle valve 54 is at its closed position. The numeral 72 designates a BC valve, the numeral 74 designates a canister, and the numeral 76 designates a transmission gear unit.

Although the engine 10 as illustrated in FIG. 1 shows only one combustion chamber 12 formed by a cylinder and piston, it should be understood that the engine control system described herein is designated for use on a four-cylinder engine. Thus, it should be understood that there are at a total of four cylinder, intake valves, exhaust valves and reciprocating pistons, four spark plugs to ignite the air-fuel mixture within the combustion chambers.

Referring to FIG. 1, the ignition system, generally designated by the numeral 30, includes a distributor 36 connected with the ignition coil 34 to energize the four spark plugs 32 of the engine. For this purpose, the ignition coil 34 has a primary winding connected across a battery 38 through a transistor Q2. The ignition coil 34 has a high voltage terminal connected to a rotor 36a of the distributor 36. The rotor 36a is driven at one-half the rotational velocity of the crankshaft. The distributor 36 has four electrical contacts 36b each of which is connected in the usual manner by separate electrical leads to the four spark plugs 32 of the engine. As the distributor rotor 36a rotates, it sequentially contacts the electrical contacts 36b to permit high voltage electrical energy to be supplied at appropriate intervals to the spark plugs 32, causing sparks to be generated across the gaps 32a, 32b, 32c and 32d of the respective spark plug 32. The distributor 36 does not control ignition-system spark-timing. Rather, spark-timing is an independently controlled variable calculated through the use of a digital computer in a manner hereinafter described.

It is to be understood that the illustrated four cylinder internal combustion engine 10 is shown and described only to facilitate engine 10 is shown and understanding of the engine control system embodying the inventive apparatus.

The amount of fuel metered to the engine, this being determined by the width of the electrical pulses applied to the fuel injector 40, the fuel-injection timing, the EGR valve position, and the ignition-system spark timing are repetitively determined from calculations performed by a digital computer, these calculations being based upon various conditions of the engine that are sensed during its operation. These sensed conditions include cylinder-head coolant temperature Tw, fuel temperature Tf, throttle position Cv, accelerator pedal position Acc, transmission gear position Nc, crankshaft position Ss, exhaust oxygen content Vs, intake air flow Qa, engine speed N, and cylinder combustion pressure. Thus, a cylinder-head coolant temperature sensor 80, a fuel temperature sensor 82, a throttle position sensor 84, an accelerator-pedal position sensor 86, a transmission-gear position sensor 88, a crankshaft position sensor 90, an oxygen sensor 92, a flow meter 94, an engine speed sensor 96, and pressure sensors 98 are connected to a control unit 100.

The cylinder-head coolant temperature sensor 80 preferably is mounted in the engine cooling system and comprises a thermistor connected in an electrical circuit capable of producing a DC voltage having a variable level proportional to coolant temperature. The fuel temperature sensor 82 preferably is a thermistor device connected in an electrical circuit capable of producing a DC voltage having a variable level proportional to fuel temperature. The throttle-valve and accelerator-pedal position sensors 84 and 86 are potentiometers electrically connected in voltage divider. circuits for supplying DC voltages proportional, respectively, to throttle-valve position and EGR-valve position. The transmission-gear position sensor 88 is responsive to the position of the transmission gear in neutral for generating a voltage signal. The crankshaft position sensor 90 produces a series of crankshaft position electrical pulses C1 each corresponding to two degrees of rotation of the engine crankshaft and a series of reference electrical pulses Ca at a predetermined number of degrees before the top dead center position of each engine piston. The oxygen sensor 92 monitors the oxygen content of the exhaust and is effective to provide a signal indicative of the air-fuel ratio at which the engine is operating. The flow meter 94 is responsive to the air flow through the induction passage 50 to provide a signal proportional thereto. The engine speed sensor 96 produces a signal corresponding to the speed of running of the engine. Each of the pressure sensors 98 comprises a force ring of the piezoelectric type. The force ring, which may be firmly secured to the engine by a spark plug or a cylinder head bolt tightened to rated torque, serves as a cylinder pressure signal source. The force ring generates a charge signal corresponding to the pressure exerted on the force ring. One example of a cylinder pressure signal source suitable for use with this invention is set forth in schematic form in FIG. 3.

Figure 3A:
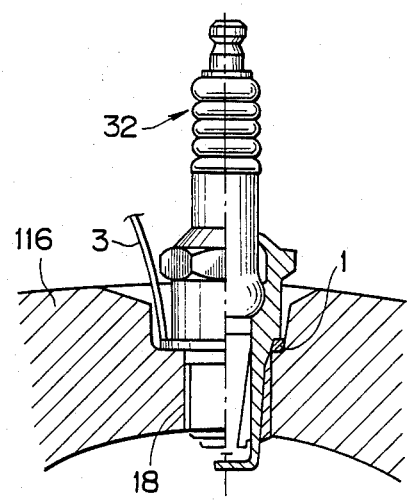
FIGS. 3(A) to 3(C) show a cylinder pressure sensor suitable for use in the apparatus.
Figure 3B:
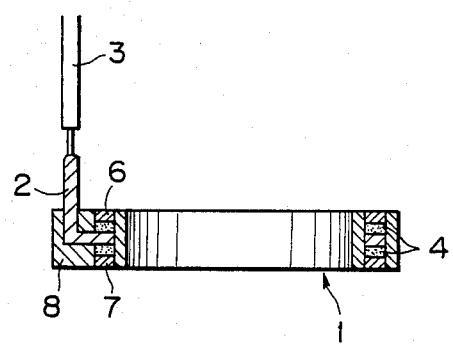
Figure 3C:
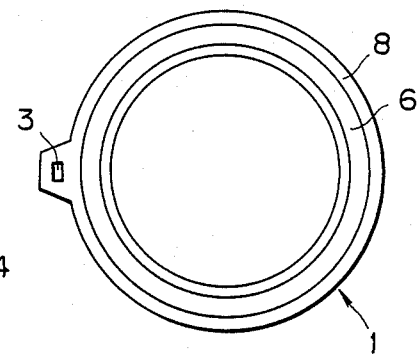

Referring to FIG. 3, the force ring, generally designated by the numeral 1, circumscribes a spark plug 32 which has a threaded portion engaged with the inward thread 18 of the cylinder head 16 of an engine cylinder 12 in a manner to tighten the force ring 1 against the cylinder head 16. The force ring 1 comprises a center ring electrode 2 connected to an output electrode 3. The center electrode 2 is sandwiched between a pair of piezoelectric ring elements 4. The upper piezoelectric element has an upper ring electrode 6 disposed thereon. The lower piezoelectric element has a lower ring electrode 7 disposed thereon. An insulating member 8 is provided, such as by molding, to insulate the force ring 1 from the spark plug 2 and the cylinder head 16. During the operation of the engine, the spark plug 32 moves and vibrates due to cylinder pressure variations and engine vibrations transmitted thereto, varying the pressure exerted on the force ring 1. The force ring 1 generates a charge signal through the output electrode 3, the charge signal varying with variations in the pressure exerted on the force ring 1. Such a pressure sensor is disclosed, for example, in Japanese Patent Publication No. 41-5154.

Figure 2:
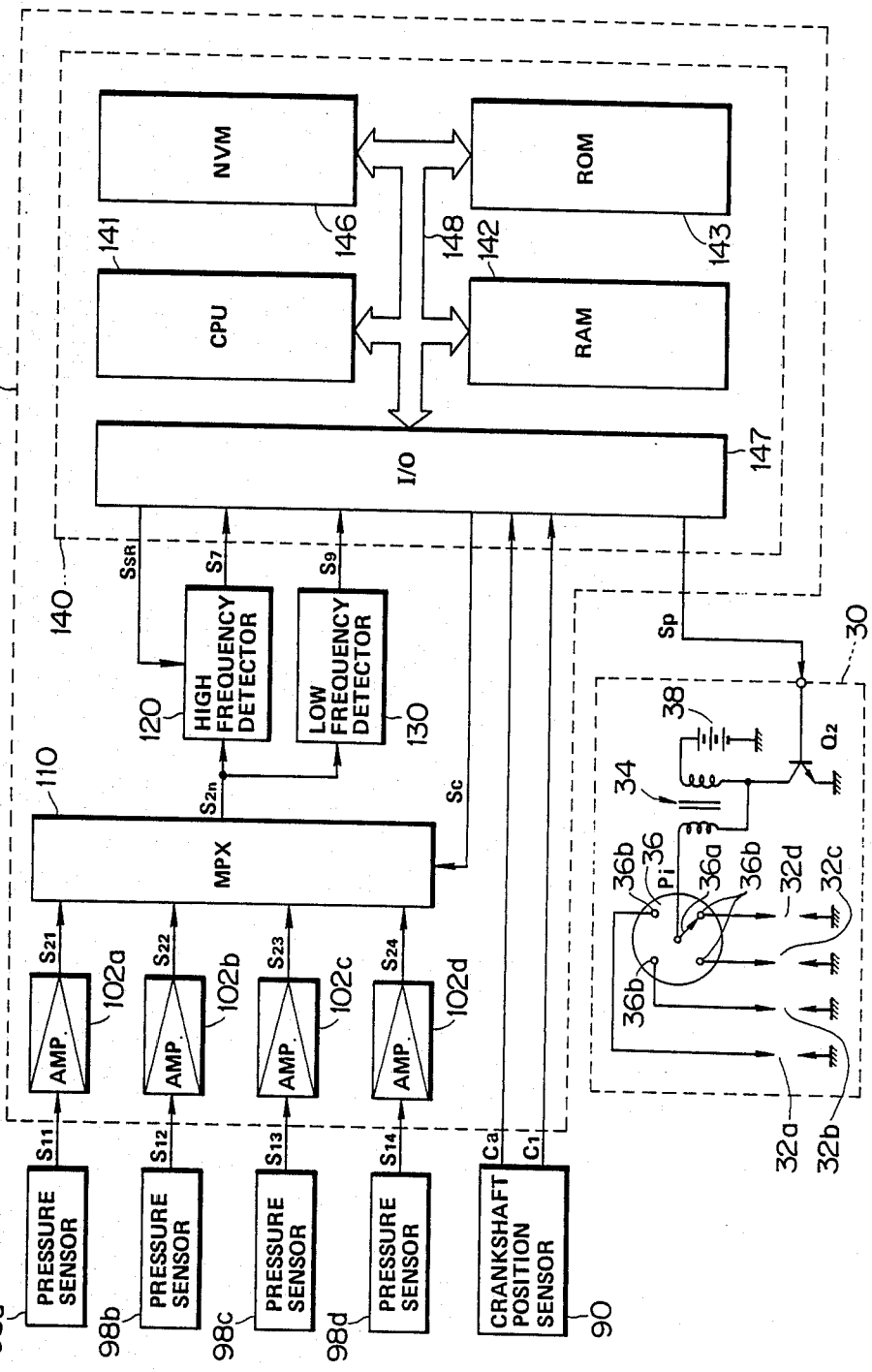
FIG. 2 is a block diagram showing a control unit included in the apparatus.
Figure 4:
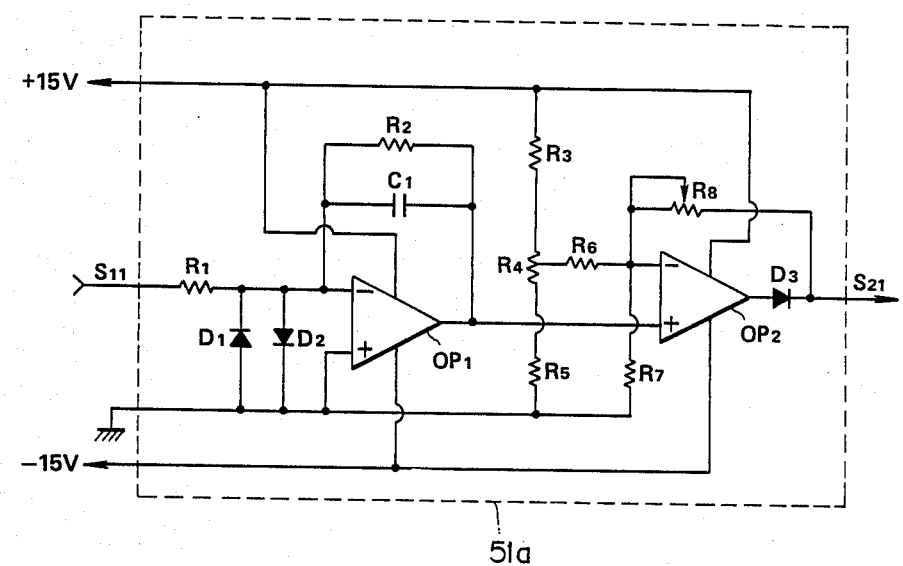
FIG. 4 is a circuit diagram of the charge amplifier circuits included in the control unit.

Returning to FIG. 2, the control unit 100 includes four charge amplifiers 102a, 102b, 102c and 102d each of which may be taken in the form of a charge-to-voltage converter as shown in FIG. 4. The charge amplifier receive charge signals S11, S12, S13 and S14 from the respective pressure sensors 98a, 98b, 98c and 98d and convert the charge signals into voltage signals corresponding to the pressures produced in the respective cylinders 12. These voltage signals are applied to an analog multiplexer 110. The analog multiplexer 110 transfers the input signals, one by one, at appropriate intervals to produce an output signal S2n. This signal S2n includes a high frequency engine detonation or knock component superimposed upon the cylinder combustion pressure signal and it is applied to a high frequency detector circuit 120 and also to a low frequency detector circuit 130.

The control unit 100 also includes a digital computer 140 which includes a central processing unit (CPU) 141, a random access memory (RAM) 142, a read only memory (ROM) 143, a nonvolatile memory (NVM) 146, and an input/output control circuit 147. The CPU 141 communicates with the rest of the computer via data bus 148. The input/output control circuit 147 includes an analog-to-digital converter, a crankshaft position counter, and a spark timing control circuit. The analog-to-digital converter receives analog signals from the various sensors 80 to 98 and also signals S7 and S8 from the high and low frequency signal component detector circuits 120 and 130 and it converts the received signals into corresponding digital signals for application to the central processing unit 141. The A to D conversion process is initiated on command from the CPU 141 which selects the input channel to be converted. The crankshaft position counter counts the crankshaft position pulses C1. The ROM 143 contains the program for operating the central processing unit 141 and further contains appropriate data in look-up tables used in calculating appropriate values for ignition-system spark timing. The look-up data may be obtained experimentally or derived empirically. The central processing unit 141 may be programmed in a known manner to interpolate between the data at different entry points if desired. Control words specifying a desired spark timing are periodically transferred by the central processing unit 141 to the spark timing control circuit which converts it into a control signal Sp to hte transistor Q2 for controlling the spark timing of the ignition system 30. The digital computer is responsive to an interrupt signal to temporarily top execution of the program control sequence (background job) and to start executing an interrupt routine for controlling the parameters during a specified operating condition.

The digital computer calculates a basic value for the timing of ignition spark events of the engine based upon engine operating parameters including intake air flow, engine speed, engine temperature, and so on. The digital computer modifies the basic value based upon the result of the engine knock decision and generates a timing control signal corresponding to the modified basic value to an ignition device which thereby times the ignition spark events of the engine. The transistor Q2 is switched on and off to cause spark firing energy to be developed to fire the spark plugs of the engine in response to the timing control signal Sp.

Figure 5:
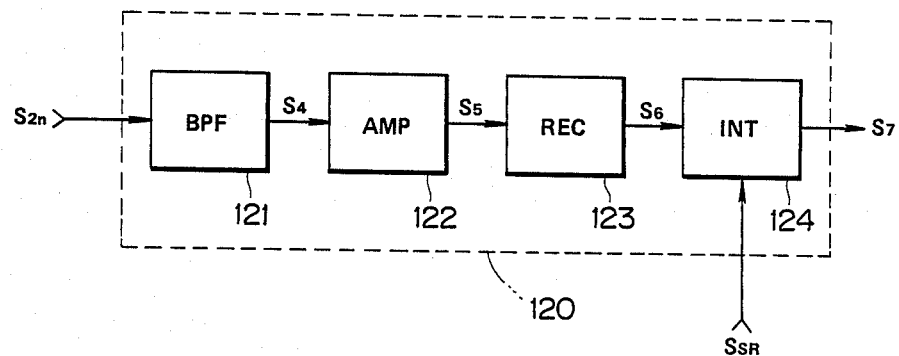
FIG. 5 is a block diagram of the high frequency detector circuit included in the control unit.
Figure 6:
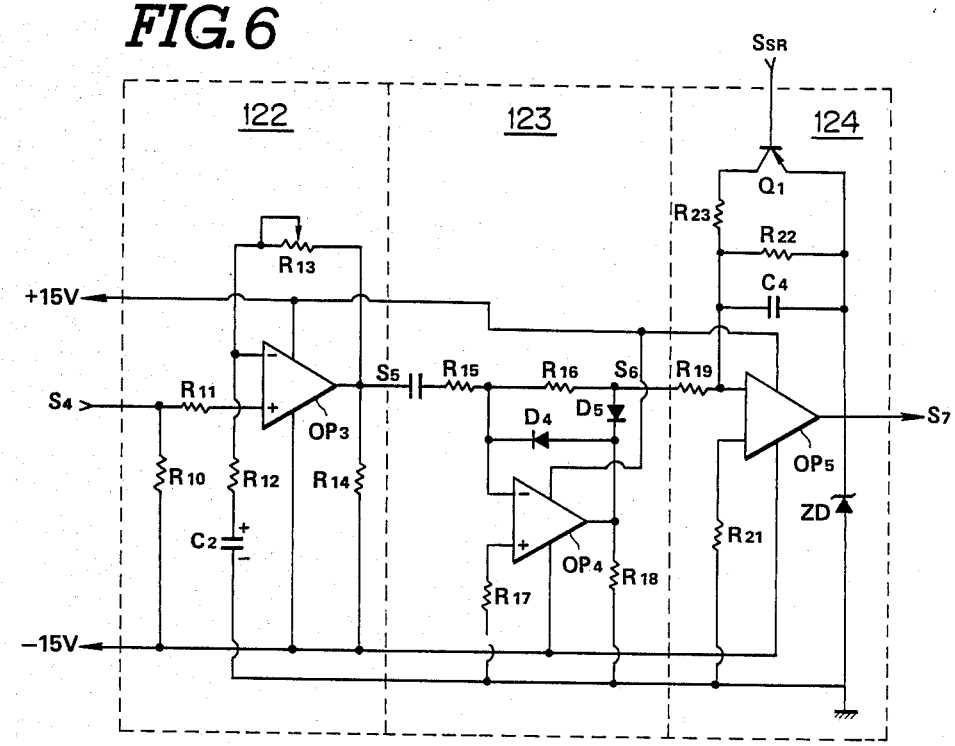
FIG. 6 is a circuit diagram of the circuits including in the high frequency detector circuit.

Referring to FIG. 5, the high frequency detector circuit 120, which includes a band-pass filter (BPF) 121, an amplifier circuit 122, a halfwave rectifier circuit 123, and an integrator circuit 124, receives the signal 2n and produces a high frequency detonation or knock signal S7. The unfiltered output signal 2n of the analog multiplexer 110 is applied to the band-pass filter 121 which filters out the low frequency cylinder combustion pressure signal component and passes the high frequency detonation or knock signal component. For this purpose, the band-pass filter circuit 121 has a specified frequency band ranging, for example, from 6 to 15 KHz, which corresponds to the frequency band of the high frequency detonation or knock signal component. The filtered signal S4 is applied to the amplifier circuit 122 including an operational amplifier OP3 and the associated circuitry, as shown in FIG. 6, which amplifies the high frequency signal component S4. The amplified signal S5 is applied to the halfwave rectifier circuit 123 including an operational amplifier OP4 and the associated circuitry, as shown in FIG. 6, which rectifies the amplified signal S5 in a halfwave rectification mode. The rectified signal S6 is applied to the integrator circuit 124 including an operational amplifier OP5, a charging capacitor C4 and the associated circuitry, as shown in FIG. 6, which integrates the rectified signal S6 at appropriate time intervals. For this purpose, the integrator circuit 124 includes a transistor Q1 having an collector-emitter path connected across the charging capacitor C4. The transistor Q1 has a base electrode coupled to a set/reset pulse signal $S_{SR}$ fed from the digital computer 140. When the set/reset signal is at a high or logic 1 level, the transistor Q1 is in the non-conductive state, permitting the integrator circuit to integrate the input signal S6. When the set/reset signal changes to a low or logic 0 level, the transistor Q1 is triggered into the conductive state, providing a short circuit for the charging capacitor C4 to stop the integrating operation and reset the integrator circuit until the set/reset signal changes to the high or logic 0 level.

Figure 7:
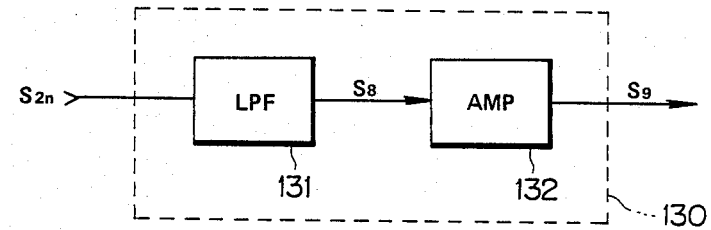
FIG. 7 is a block diagram of the low frequency detector circuit included in the control unit.

Referring to FIG. 7, the low frequency detector circuit 130, which includes a low-pass filter (LPF) 131, and an amplifier circuit 132, receives the singal 2n and produces a low frequency cylinder combustion pressure signal S9. The unfiltered output signal 2n of the analog multiplexer 110 is applied to the low-pass filter 131 which filters out the high frequency detonation or knock signal component and passes the low frequency cylinder combustion pressure signal component below a predetermined frequency, for example, 1 KHz. The filtered low frequency signal component S8 is applied to the amplifier circuit 132 which amplifies it. The amplified signal S9 is applied to the digital computer 140.

Figure 8:
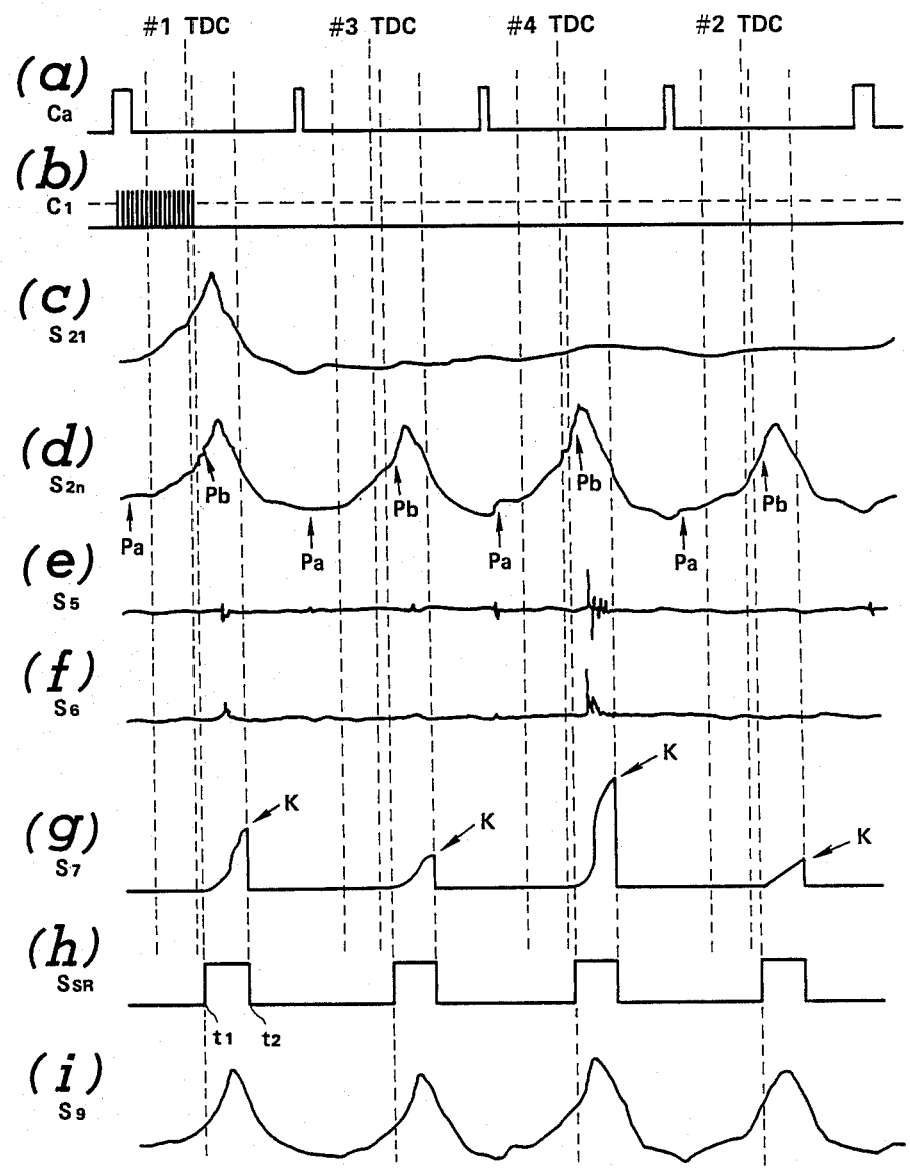
FIG. 8 contains nine waveforms for the various signals obtained in the control unit.

With particular reference now to FIG. 8, there are shown nine voltage-versus-time waveforms for the various signals obtained in the control unit 100. It is considered that the sequence or order of firing of the engine is as follows: Cylinder No. 1, No. 3, No. 4 and No. 2. FIG. 8a illustrates the reference pulses Ca produced at a predetermined number of degrees before the top dead center position of each engine piston. The reference pulse Ca for the cylinder No. 1 has a pulse width greater than the reference pulses Ca for the other cylinders. FIG. 8b illustrates a series of crankshaft position pulses C1 each corresponding to two degrees of rotation of the engine crankshaft. Assuming now that the charge amplifier circuit 102a and the associated circuit are in order, the charge amplifier circuit 102a generates an output signal S21, as shown by the waveform 8c. Similar waveforms appear at the outputs of the respective charge amplifier circuits 102b, 102c and 102d. The analog multiplexer 110 is actuated on command Sc from the CPU 141 which selects the input channel to be outputted to produce an output signal S2n, as shown in the waveform 8d. The output signal S2n is applied to the high frequency detector circuit 120 and also to the low frequency detector circuit 130. In the high frequency detector circuit 120, the combination of the band pass filter 121 and the amplifier circuit 122 receives the signal S2n and produces a filtered signal S5, as shown by the waveform 8e. The filtered signal S5 is applied to the halfwave rectifier circuit 123 which produces an output signal S6, as shown in the waveform 8f. The rectified signal S6 is applied to the integrator circuit 124.

FIG. 8h illustrates the set/reset signal $S_{SR}$ produced from the digital computer 140 to the transistor Q1 of the integrator circuit 124. The CPU 141 provide a command to start the crankshaft position counter counting the crankshaft position pulses C1 when a reference pulse Ca occurs. The CPU 141 changes the set/reset signal $S_{SR}$ to the high level so as to start the integrator circuit 124 integrating the rectified signal S6 at a time t1 when the crankshaft position counter accumulates a count which corresponds to 5 degrees after the top dead center of the piston of the cylinder No. 1. The CPU 141 changes the set/reset signal $S_{SR}$ to the low level stopping the operation of the integrator circuit 124 at a time t2 when the crankshaft position counter accumulates a count which corresponds to 45 degrees after the top dead center of the piston of the cylinder No. 1. Thus, the integrator circuit 124 integrates the rectified signal S6 in a period from the time t1 to the time t2, thereby providing an integrated value K, as shown by the waveform 8g, which corresponds to the engine knock level. Similar operations are performed for the other cylinders. The CPU 141 provide a command to start the analog-to-digital converter converting the integrated signal S7 into a corresponding digital value K which is correlative to the engine knock level and read the converted value K into the RAM 142. FIG. 8i illustrates the output signal S9 of the low frequency detector circuit 130.

Figure 9:
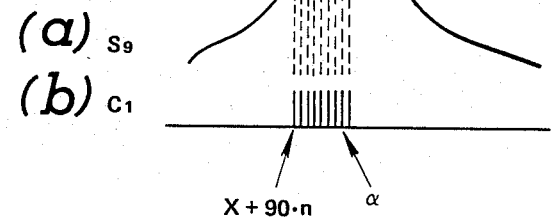
FIG. 9 contains two waveforms used in explaining one A to D conversion cycle during which the low frequency combustion pressure signal is converted into digital form.

Referring to FIG. 9, there is illustrated one A to D conversion cycle during which the low frequency combustion pressure signal S9 is converted into digital form each time a crankshaft position pulse C1 occurs. For this purpose, the digital computer read the count of the crankshaft position counter at intervals o occurrence of the crankshaft position pulses C1. The crankshaft position counter is reset to stat counting the crankshaft position pulses C1 each time a reference pulse C1 having a greater pulse width, as described in connection with FIG. 8a occurs. A first flag is set when the crankshaft position counter accumulates a predetermined count X which is in a crankshaft position counter count range from 0 to 90, this count range corresponding to the engine crankshaft angle range during which the air-fuel mixture is burnt in the cylinder No. 1 and is cleared when the crankshaft angle $\theta_{pmax}$ at which the cylinder pressure is at maximum is calculated for the cylinder No. 1. Similarly, the first flag is set when the crankshaft position counter accumulates a count X+90 which is in a crankshaft position counter count range from 90 to 180, this count range corresponding to the engine crankshaft angle range during which the air-fuel mixture is burnt in the cylinder No. 3 and is cleared when the crankshaft angle $\theta_{pmax}$ at which the cylinder pressure is at maximum is calculated for the cylinder No. 3. The first flag is set when the crankshaft position counter accumulates a count X+180 which is in a crankshaft position counter count range from 180 to 270, this count range corresponding to the engine crankshaft angle range during which the air-fuel mixture is burnt in the cylinder No. 4 and is cleared when the crankshaft angle $\theta_{pmax}$ at which the cylinder pressure is at maximum is calculated for the cylinder No. 4. The first flag is set when the crankshaft position counter accumulates a count X+270 which is in a crankshaft position counter count range form 270 to 360, this count range corresponding to the engine crankshaft angle range during which the air-fuel mixture is burnt in the cylinder No. 2 and is cleared when the crankshaft angle $\theta_{pmax}$ at which the cylinder pressure is at maximum is calculated for the cylinder No. 2.

Figure 10:
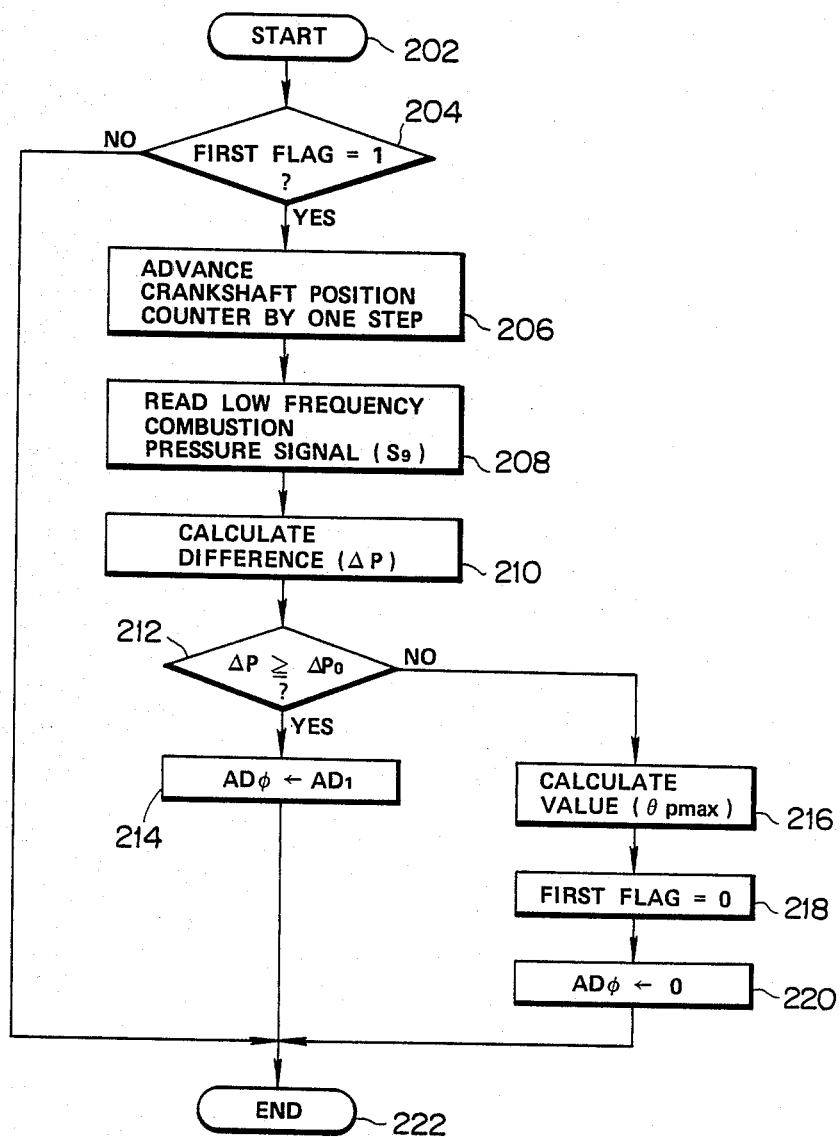
FIG. 10 is a flow diagram illustrating the programming of the digital computer as it is used to determine the crankshaft angle at which the low frequency cylinder combustion pressure is at maximum.

FIG. 10 is a flow diagram illustrating the programming of the digital computer 140 as it is used to determine the crankshaft angle $\theta_{pmax}$ at which the low frequency cylinder combustion pressure is at maximum in each cylinder.

The computer program is entered at the point 202 in response to each of the crankshaft position pulses C1. At the point 204 in the program, a determination is made as to whether or not the first flag is set to indicate that the engine crankshaft angle is within a range during which the low frequency cylinder combustion pressure signal S9 is converted into digital form.

If the answer to this question is "no", then the program proceeds to the end point 222. Otherwise, the program proceeds to the point 206 where the crankshaft position counter is advanced by one step which corresponds to 2 degrees of rotation of the engine crankshaft. At the point 208 in the program, the central processing unit 141 actuates the analog-to-digital converter to convert the existing value for the low frequency cylinder combustion pressure signal S9 into digital form and reads the converted digital value into the RAM 142, for example, several ten microseconds after. At the following point 210, a difference ($\Delta P = AD1 - AD\phi$) is calculated between the old and new values for the low frequency cylinder combustion pressure signal.

At the point 212 in the program, a determination is made as to whether or not the calculated differrence ($\Delta P$) is equal to or greater than a predetermined value ($\Delta Po$). If the answer to this question is "yes", then it means that the low frequency cylinder combustion pressure signal S9 is not at maximum and the program proceeds to the point 214 where the new value (AD1) replaces the old value (AD$\phi$) and then to the end point 222. If the difference ($\Delta P$) is smaller than the low frequency cylinder combustion pressure signal S9 is at maximum and the program proceeds to the point 216 where the crankshaft position $\theta_{pmax}$ at which the cylinder combustion pressure is at maximum is calculated from a relationship. This relationship is as a function of the count $\alpha$ of the crankshaft position counter and the predetermined angular position X and is expressed as $\theta_{pmax} = 2(\alpha + X) - 70$. The calculated crankshaft position $\theta_{pmax}$ is a crankshaft angle with respect to the top dead center of the piston of the corresponding cylinder. Following this, at the point 218, the first flag is cleared. After, at the point 220, the old value (AD$\phi$) is cleared for the next A to D conversion process, the program proceeds to the end point 222. The calculated crankshaft position $\theta_{pmax}$ is used for the MBT control which will be described later.

Figure 11:
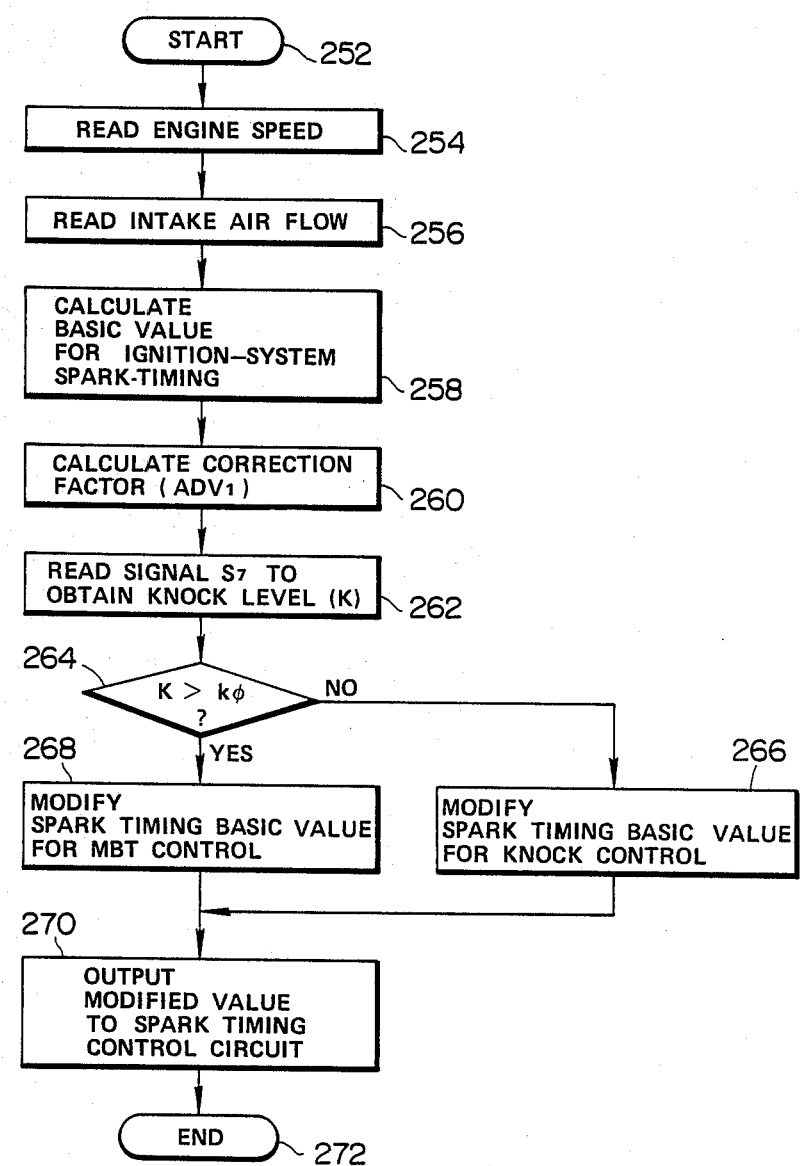
FIG. 11 is a flow diagram illustrating the programming of the digital computer as it is used to calculate a desired value for ignition-system spark-timing.

FIG. 11 is a flow diagram illustrating the programming of the digital computer 140 as it is used to control the ignition-system spark timing.

Figure 12:
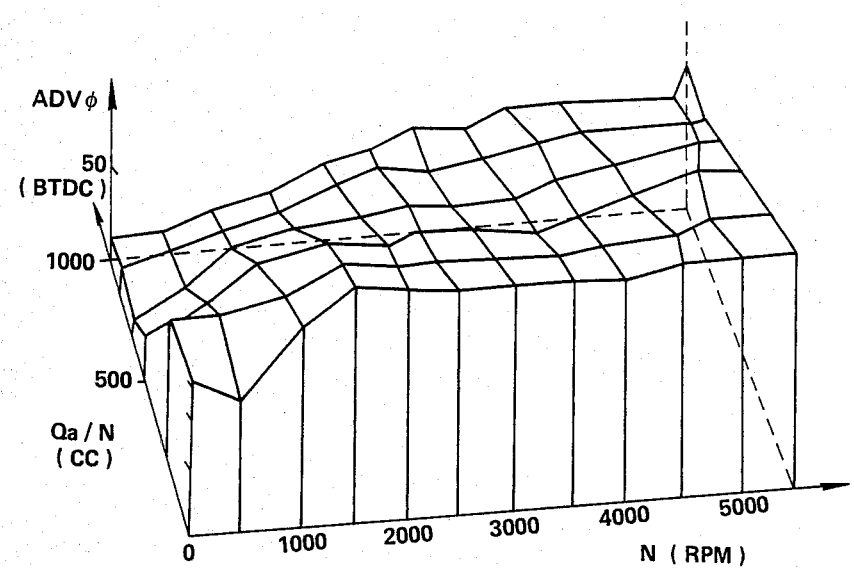
FIG. 12 shows a look-up table used in calculating a desired ignition-system spark-timing value.

The computer program is entered at the point 252 at the end of each calculation of a crankshaft position $\theta_{pmax}$ at which the cylinder pressure is at maximum. At the point 54 in the program, the engine speed N is read into the RAM 142 and, at the point 256, the engine intake air flow Qa is read into the RAM 142. At the point 258 in the program, the digital computer central processing unit 141 looks at a basic value (ADV$\phi$) for ignition-system spark timing in a look-up table which defines the value ADV$\phi$ as a function of engine speed N and intake air flow Qa, as shown in FIG. 12. At the point 260 in the program, the digital computer central processing unit 141 looks at a correction factor (ADV1) in a look-up table which defines the value ADV1 as a function of engine speed N and intake air flow Qa. The look-up data are obtained experimentally and stored in the NVM 146 during the execution of the main routine.

At the point 262 in the program, the output signal S7 of the high frequency detector circuit 120 is converted to digital form by the analog-to-digital converter and read it into the RAM 142. The read digital value K corresponds to the knock induced vibration level. At the point 264, a determination is made as to whether or not the read value K is equal to or greater than a predetermined slice level K$\phi$. If the answer to this question is "yes", then it means that engine knock occurs and the program proceeds to the point 266 where the basic value for ignition-system spark-timing is modified in a manner to suppress the engine knock. Following this, the program proceeds to the point 270 where the modified value is outputted to the spark timing control circuit.

If the read value K is smaller than the slice level K$\phi$ inputted at the point 264, then it means that no engine knock occurs and the program proceeds to the point 268 where the basic value is modified using the correction factor (ADV1) in a manner to maintain the crankshaft position $\theta_{pmax}$ at which the cylinder pressure is at maximum at a predetermined position relative to piston top dead center. This MBT control is well known in the art and is disclosed, for example, in Japanese Patent Kokai No. 58-82074. Following this, at the point 270, the modified value is outputted to the spark timing control circuit.

It was found that the high frequency detonation or knock signal S7 and/or the low frequency cylinder combustion pressure signal S9 exhibits an abnormal state in the event of engine misfire or failure of the cylinder pressure sensor 98 and the associated signal line between the cylinder pressure sensor 98 and the charge amplifier circuit 102. According to the invention, the high frequency detonation or knock signal S7 and the low frequency cylinder combustion pressure signal S9 are monitored to detect a cause of the abnormal state.

Referring to FIG. 13, there are shown four voltage-versus-time waveforms for the low frequency cylinder combustion pressure signal S9. FIG. 13a illustrates the typical waveform of the low frequency cylinder combustion pressure signal S9 when gas leaks from the combustion chamber 12 to the exterior thereof through the threaded hole in which the spark plug 32 is threaded. The gas leakage between the threaded hole and the spark plug 2 causes a force to exert on the cylinder pressure sensor piezoelectric elements in the direction opposite to the direction in which the spark plug 32 exerts a force on the piezoelectric elements. As a result, the low frequency cylinder combustion pressure signal S9 has its magnitude reduced to a considerable extent, as shown in FIG. 13a. The gas leakage has no influence on the high frequency detonation or knock signal S7. This case will be referred to as abnormal mode I.

Figure 13A:
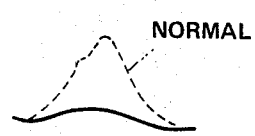
FIGS. 13(A) to 13(D) contain four waveforms for the low frequency cylinder combustion pressure signal.
Figure 13B:
Figure 14:
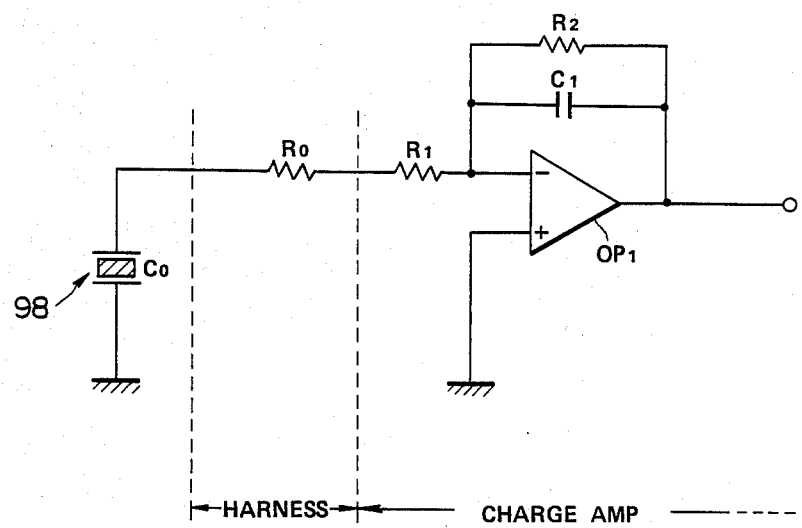
FIG. 14 is a circuit diagram used in explaining a failure of the signal line between the cylinder pressure sensor and the control unit.

FIG. 13b illustrates the typical waveform of the low frequency cylinder combustion pressure signal S9 when the electrical resistance of the signal line between the cylinder pressure sensor 98 and the charge amplifier circuit 102 increases, for example, due to an increase in the contact resistance of the connector for the signal line. This case will be referred to as abnormal mode II and described in greater detail with reference to FIG. 14. The cylinder pressure sensor piezoelectric elements, which sandwich a center ring electrode to constitute a capacitor, is connected through a harness to the input resistor of the charge amplifier circuit 102. The capacitor and the series circuit of the harness and the input resistor consitute an RC filter. The attenuation factor ATT of the RC filter is given as:

$$ATT = |1/1 + jw \times (Ro + R1) \times Co|$$

where Ro is the resistance of the harness, R1 is the resistance of the input resistor, and Co is the capacitance of the capacitor.

As can be seen from this equation, the attenuation factor ATT is greater for higher frequency signal components. Consequently, the high frequency detonation or knock signal S7 is attenuated to a considerable extent, whereas the low frequency cylinder combustion pressure signal S9 is subject to almost no influence, as shown in FIG. 13b.

Figure 13C:
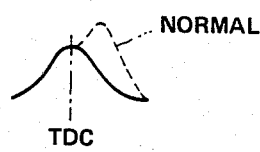

FIG. 13c illustrates the typical waveform of the low frequency cylinder combustion pressure signal S9 when misfire occurs in the cylinder. This case will be referred to as abnormal III. The waveform of the low frequency cylinder combustion pressure signal S9 is symmetric with respect to the axis of the top dead center (TDC) of the piston of the cylinder, as shown in FIG. 13c. In this case, the high frequency detonation or knock signal S9 is reduced to zero.

Figure 13D:
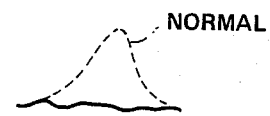

FIG. 13d illustrates the typical waveform of the low frequency cylinder combustion pressure signal S9 when the signal line between the cylinder pressure sensor 98 and the change amplifier circuit 102 opens or short-circuits. This case will be referred to as abnormal mode IV. In this case, both of the high frequency detonation or knock signal S7 and the low frequency cylinder combustion pressure signal S9 are reduced to zero.

Figure 15:
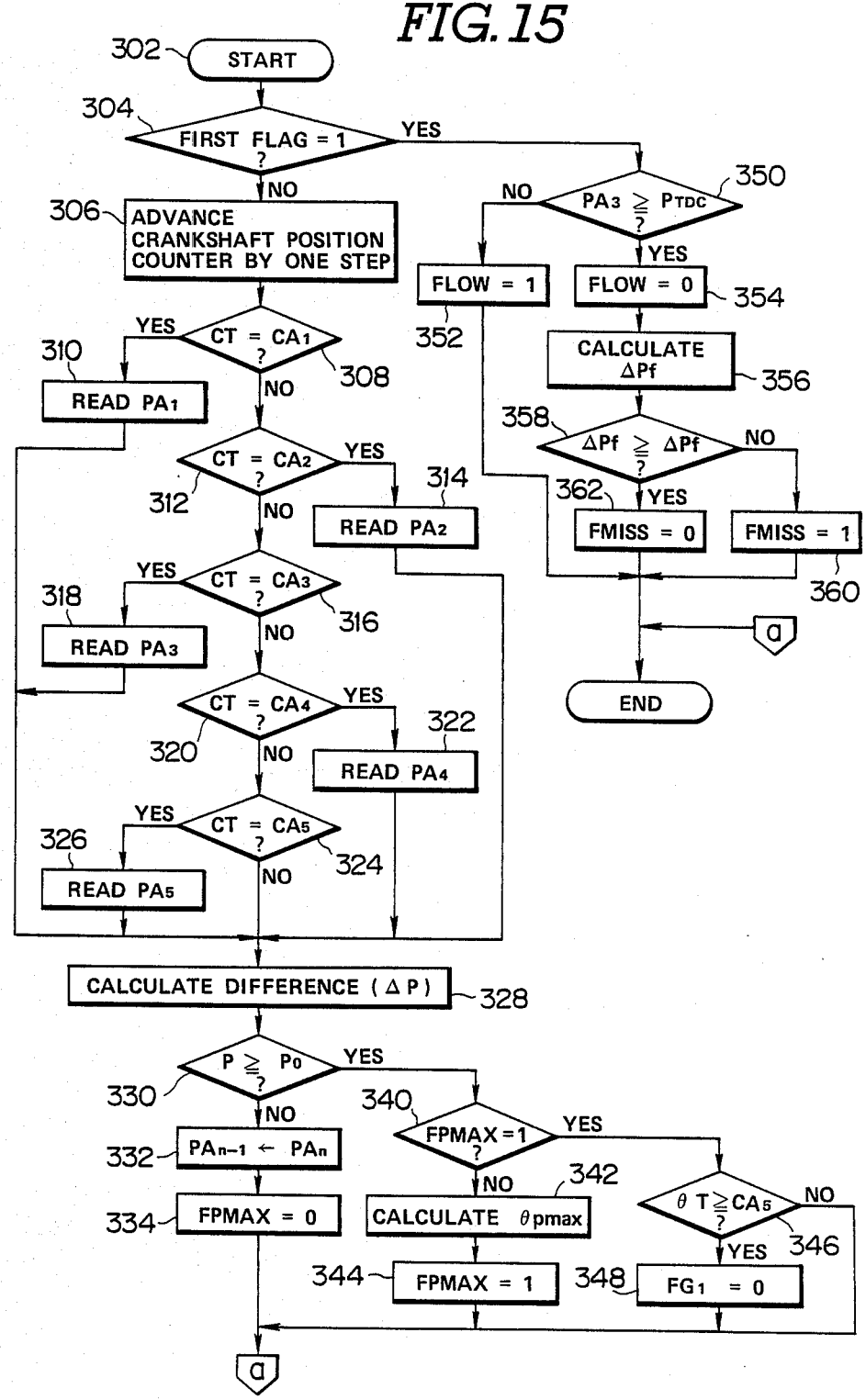
FIG. 15 is a flow diagram illustrating the programming of the digital computer as it is used to determine the condition of the low frequency cylinder combustion pressure signal.

FIG. 15 is a flow diagram illustrating the programming of the digital computer 140 as it is used to determine the crankshaft angle $\theta_{pmax}$ at which the low frequency cylinder combustion pressure is at maximum in each cylinder.

Figure 16:
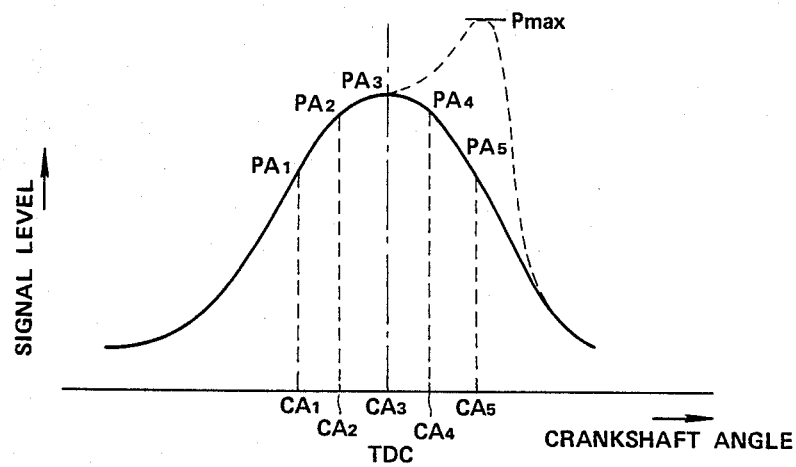
FIG. 16 contains one waveform for the low frequency cylinder pressure signal for use in explaining the manner in which the low frequency cylinder combustion pressure signal is converted into digital form.

The computer program is entered at the point 302 in response to each of the crankshaft position pulses C1. At the point 304 in the program, a determination is made as to whether or not the first flag is set to indicate that the engine crankshaft angle is within a range during which the low frequency cylinder combustion pressure signal S9 is converted into digital form. If the answer to this question is "yes", then the program proceeds to the point 306 where the crankshaft position counter is advanced by one step which corresponds to 2 degrees of rotation of the engine crankshaft. Following this, the digital computer central processing unit 141 actuates the analog-to-digital converter to convert the existing values for the low frequency cylinder combustion pressure signal S9 into the RAM 142. The manner in which the low frequency cylinder combustion pressure signal S9 is converted may best seen in FIG. 16. In FIG. 16, the characters CA1, CA2, CA3, CA4 and CA5 indicate equally-spaced crankshaft angles at which the low frequency cylinder combustion pressure signal S9 is converted into digital form. The crankshaft angle CA3 corresponds to the top dead center of the piston of the cylinder.

At the point 308 in the program, a determination is made as to whether or not the engine crankshaft is at the angle CA1. This determination is made as to whether or not the crankshaft position counter accumulates a count CT corresponding to the crankshaft angle CA1. If the answer to this question is "yes", then the program proceeds to the point 310 where the value PA1 (FIG. 16) for the low frequency cylinder combustion pressure signal S9 is converted into a corresponding digital value and read into the RAM 142. Otherwise, the program proceeds to the point 12 where a determination is made as to whether or not the engine crankshaft is at the angle CA2. This determination is made as to whether or not the crankshaft position counter accumulates a count CT corresponding to the crankshaft angle CA2. If the answer to this question is "yes", then the program proceeds to the point 314 where the value PA2 (FIG. 16) of the low frequency cylinder combustion pressure signal S9 is converted into digital form and read into the RAM 142. Otherwise, the program proceeds to the point 316 where a determinatinon is made as to whether or not the engine crankshaft is at the angle CA3. This determination is made as to whether or not the crankshaft position counter accumulates a count CT corresponding to the crankshaft angle CA3. If the answer to this question is "yes", then the program proceeds to the point 318 where the value PA3 (FIG. 16) of the low frequency cylinder combustion pressure signal S9 is converted into a corresponding digital value and read into the RAM 142. Otherwise, the program proceeds to the point 320 where a determination is made as to whether or not the engine crankshaft is at the angle CA4. This determination is made as to whether or not the crankshaft position counter accumulates a count CT corresponding to the crankshaft angle CA4. If the answer to this question is "yes", then the program proceeds to the point 322 where the value PA4 (FIG. 16) of the low frequency cylinder combustion pressure signal S9 is converted into a corresponding digital value and read into the RAM 142. Otherwise, the program proceeds to the point 324 where a determination is made as to whether or not the engine crankshaft is at the angle CA5. This determination is made as to whether or not the crankshaft position counter accumulates a count CT corresponding to the crankshaft angle CA5. If the answer to this question is "yes", then the program proceeds to the point 326 where the value PA5 of the low frequency cylinder combustion pressure signal S9 is converted into digital form and read into the RAM 142. Otherwise, the program proceeds to the point 328.

At the point 328 in the program, a difference ($\Delta P$) is calculated between the old and new values ($PA_{n-1}$, $PA_n$) for the low frequency cylinder combustion pressure signal S9. At the point 330 in the program, a determination is made as to whether or not the calculated difference ($\Delta P$) is equal to or greater than a predetermined value ($\Delta Po$). If the answer to this question is "yes", then it means that the low frequency cylinder combustion pressure signal S9 is not at maximum and the program proceeds to the point 332 where the new value ($PA_n$) replaces the old value ($Pa_{n-1}$) and then to the point 34 where a flag FPMAX is set just after the crankshaft angle $\theta_{pmax}$ at which the cylinder pressure is at maximum is calculated.

If the answer to the question inputted at the point 330 is "no", it means that the low frequency cylinder combustion pressure signal S9 is at maximum and the program proceeds to another determination point 340. This determination is as to whether or not the flag FPMAX is set to indicate that the crankshaft angle $\theta_{pmax}$ is calculated. If the answer to this question if "no", then the program proceeds to the point 342 where the crankshaft angle $\theta_{pmax}$ at which the cylinder pressure is at maximum is calculated from a relationship. This relationship is as a function of the count $\alpha$ of the crankshaft position counter and the predetermined angular position X and is expressed as $\theta_{pmax} = 2(\alpha+X) - 70$. The calculated crankshaft position $\theta_{pmax}$ is a crankshaft angle with respect to the top dead center of the piston of the corresponding cylinder. Following this, the program proceeds to the point 344 where the flag FPMAX is set.

If the answer to the question inputted at the point 340 is "yes", then the program proceeds to the point 346 where a determination is made as to whether or not the count $\theta T$ of the $\theta_p$ counter which counts the crankshaft position pulses CA is equal to or greater than a predetermined value CA5 corresponding to the crankshaft position of 5 degrees after top dead center. If the answer to this question is "yes", then the program proceeds to the point 348 where the first flag is cleared to indicate that the position of the engine crankshaft is out of the range where the low frequency cylinder combustion pressure signal S9 is converted into digital form.

If the answer to the question inputted at the point 304 is "no", then it means that the engine crankshaft angle is out of the range during which the low frequency cylinder combustion pressure signal S9 is converted and the program proceeds to decide the abnormal state of the low frequency cylinder combustion pressure signal S9. At the point 350 in the program, a determination is made as to whether or not the value PA3 read at the top dead center position of the piston for the low frequency cylinder combustion pressure signal S9 is equal to or greater than a reference value $P_{TDC}$ which corresponds to a normal cylinder pressure produced when the cylinder piston is at its top dead center. For this purpose, the digital computer look at the reference value $P_{TDC}$ from a look-up table which defines the reference value as a function of engine speed N and intake air flow Qa in the background job (BGJ).

If the answer to this question is "no", then the program proceeds to the point 352 where a flag FLOW is set to indicate abnormal mode I or IV. Otherwise, the program proceeds to the point 354 where the flag FLOW is cleared. At the point 356 in the program, a symmetric difference ($\Delta Pf$) is calculated from the following equation:

$$\Delta Pf = (PA5 - PA1) + (PA4 - PA2)$$

The symmetric difference ($\Delta Pf$) is almost zero when engine misfire occurs. At the point 358 in the program, a determination is made as to whether or not the calculated symmetric difference ($\Delta Pf$) is equal to or greater than a reference value ($\Delta Pf0$). The reference value is set at zero at low load conditions and at a value somewhat greater than zero at high load conditions in the background job. If the answer to this question is "no", then the program proceeds to the point 360 where the flag FMISS is set to indicate engine misfire. Otherwise, the program proceeds to the point 362 where the flag FMISS is cleared.

Figure 17:
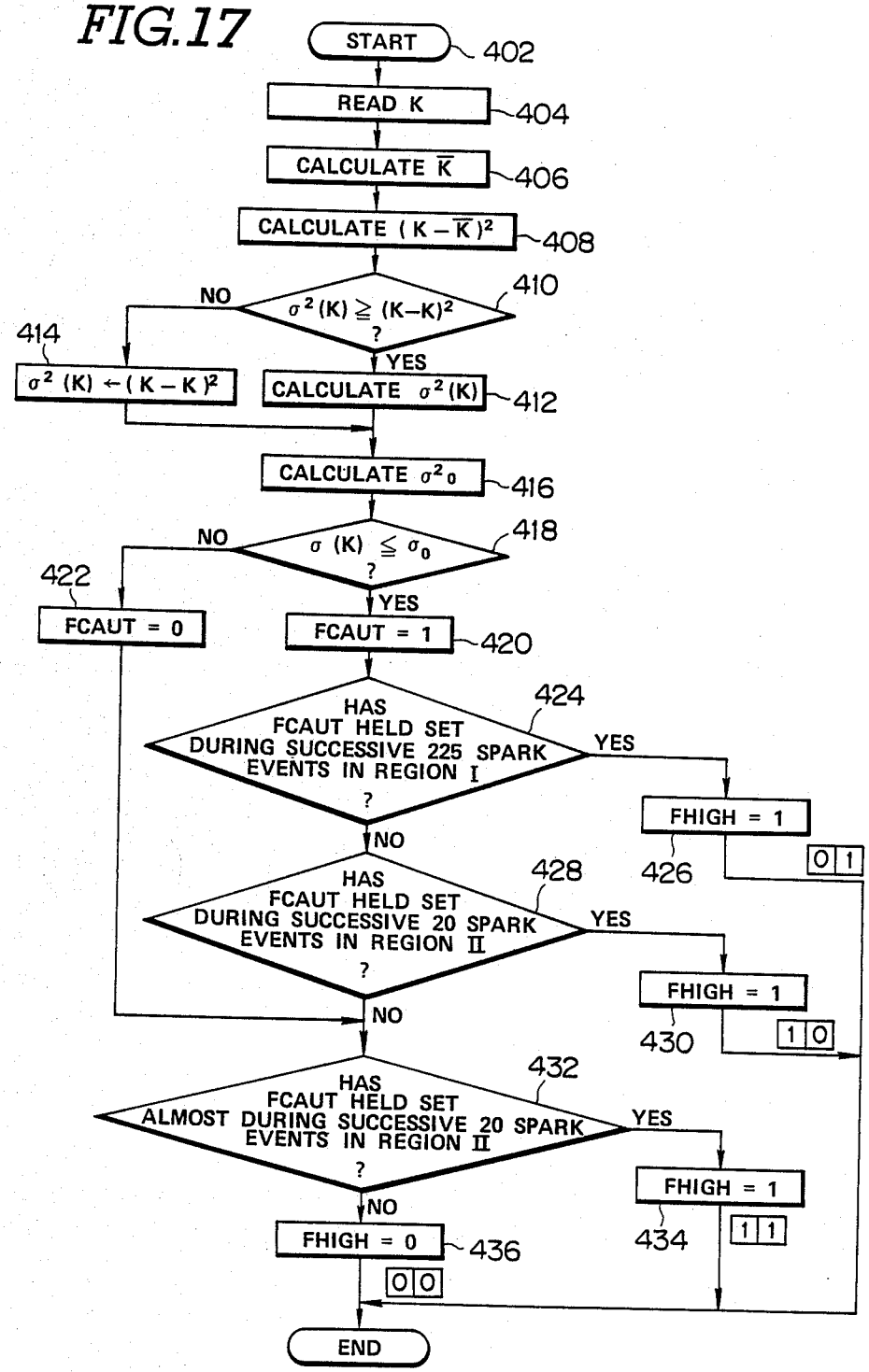
FIG. 17 is a flow diagram illustrating the programming of the digital computer as it is used to determine the condition of the high frequency knock signal.

FIG. 17 is a flow diagram illustrating the programming of the digital computer as it is used for a decision of the abnormal state of the high frequency detonation or knock signal S7.

The computer program is entered at the point 402 in response to an interrupt signal which is produced one crankshaft position pulse C1 before the time t2 (FIG. 8) when the set/reset signal $S_{SR}$ changes to the low or logic 0 level stopping the operation of the integrator circuit 124. At the point 404 in the program, the high frequency detonation or knock signal S7 is converted into digital form and the converted digital value K is read into the RAM 142. At the point 406 in the program, the digital computer central processing unit 141 calculates the knock level moving average $\overline{K}$ from the following equation:

$$\overline{K} = \frac{n-1}{n} \times \overline{K}' + \frac{1}{n} \times K$$

where $\overline{K}'$ is the old moving average calculated in the previous cycle of execution of this program and n is a constant. The constant n may be 16. For this calculation, the computer obtains the knock level moving average old value $\overline{K}'$ previously read into the RAM 142. The newly calculated value $\overline{K}$ replaces the old value $\overline{K}'$ in the RAM 142. The program proceeds to the point 408 where the central processing unit calculates a variance as $(K - \overline{K})^2$. At the point 410 in the program, a determination is made as to whether or not the calculated variance $(K - \overline{K})^2$ is equal to or smaller than the variance old value $\sigma^{2\prime}(K)$ previously read into the RAM 142. For this determination, the computer obtains the variance old value $\sigma^{2\prime}(K)$ previously read into the RAM 142 and compares this value with the value $(K - \overline{K})^2$ calculated at the point 408. If the answer to this question is "yes", then it means that the high frequency detonation or knock signal S7 decreases which would result from a failure in the pressure sensor or the associated circuit and the program proceeds to the point 412 where a variance moving average $\sigma^2(K)$ is calculated as:

$$\sigma^2(K) = \frac{n-1}{m} \times \sigma^{2\prime}(K) + \frac{1}{m} \times (K - \overline{K})^2$$

where $\sigma 2'(K)$ is the old variance value calculated in the previous cycle of execution of this program and m is a constant. The constant may be 16. For this calculation, the computer obtains the variance moving average old value $\sigma^{2\prime}(K)$ previously read into the RAM 142. The newly calculated value $\sigma^2(K)$ replaces the old value $\sigma^{2\prime}(K)$ in the RAM 142.

If the answer to the question inputted at the point 410 is "no", then it means that the high frequency detonation or knock signal S7 increases without any failure and the program proceeds to the point 414 where the calculated value $(K - \overline{K})^2$ replaces the old value $\sigma^2(K)$ in the RAM 142.

At the point 416 in the program, the digital computer looks at the slice level $\sigma^2 o$ from a table which defines the slice level as a function of engine speed N. At the point 418, a determination is made as to whether or not the variance new value $\sigma^2(K)$ is equal to or less than the slice value $\sigma^2 o$. If the answer to this question is "yes", then the program proceeds to the point 420 where a flag FCAUT is set to indicate a caution for the possibility of failure of the cylinder pressure sensor or the associated circuit. Otherwise, the program proceeds to the point 422 where the flag FCAIT is cleared and then to the point 432.

Figure 18:
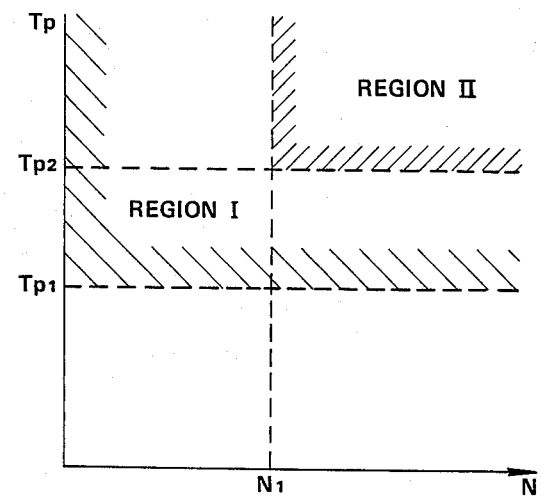
FIG. 18 is a diagram showing two regions of engine operating conditions.

Following this, the failure is decided by making determinations for the time period during which the flag FCAUT remains set in connection with engine operating conditions. As shown in FIG. 18, a first region (I) is specified when the basic value Tp for fuel delivery requirements is greater than a first value Tp1 and a second region (II) is specified when the basic value Tp for fuel delivery requirement is greater than a second value Tp2 greater than the first value Tp1 and the engine speed N is greater than a value N1.

Thus, at the point 424 in the program, a determination is made as to whether or not the flag FCAUT has held its set state for a time period greater than the time period during which 255 successive spark events occur under engine operating conditions specified in the first region (I). If the answer to this question is "yes", then the program proceeds to the point 426 where a two-bit flag FHIGH is set at "01" and then to the end point. Otherwise, the program proceeds to another determination point 428. This determination is as to whether or not the caution flag FCAUT has held its set state for a time period greater than the time period during which 20 successive spark events occur under engine operating conditions specified in the second region (II). If the answer to this question is "yes", then the program proceeds to the point 430 where the flag FHIGH is set at "10" and then to the end point. Otherwise, the program proceeds to another determination point 432. This determination is as to whether or not the caution flag FCAUT has almost held its set state for a time period greater than the time period during which the 20 spark events occurs in one cylinder under engine operating conditions specified by the second region II. If the answer to this question is "yes", then the program proceeds to the point 434 where the flag FHIGH is set at "11" and then to the point 436 where the flag FHIGH is cleared and then to the end point.

Figure 19:
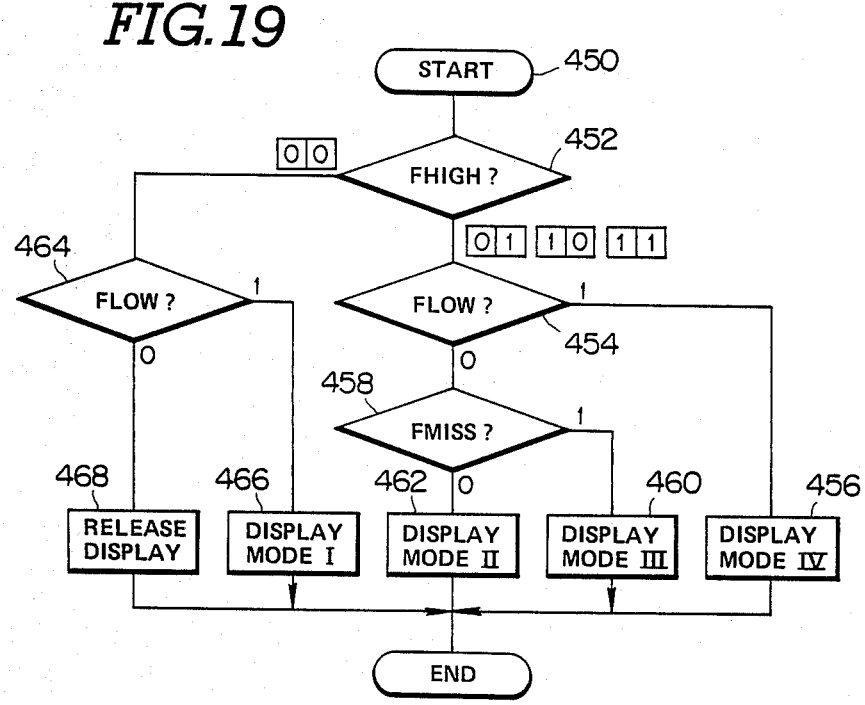
FIG. 19 is a flow diagram illustrating the programming of the digital computer as it is used to determine causes of the failure indication.

FIG. 19 is a flow diagram illustrating the programming of the digital computer as it is used for a decision of one of the abnormal modes I, II, III and IV.

The computer program is entered at the point 450. At the point 452 in the program, a determination is made as to whether or not the flag FHIGH is on. If the answer to this question is "yes", then the program proceeds to anther determination point 454. This determination is as to whether or not the flag FLOW is on. If the answer to this question is "yes", then the program proceeds to the point 456 where the abnormal move IV is displayed to indicate an open or short circuit in the signal line. Otherwise, the program proceeds to the point 458 where a determination is made as to whether or not the flag FMISS is on. If the answer to this question is "yes", then the program proceeds to the point 460 where the abnormal mode III is displayed to indicate engine misfire. Otherwise, the program proceeds to the point 462 where the abnormal mode II is displayed to indicate an increase in the electric resistance of the signal line.

If, at the point 452 in the program, the flag FHIGH is off, then the program proceeds to the point 464 where a determination is made as to whether or not the flag FLOW is on. If the answer to this question is "yes", then the program proceeds to the point 466 where the abnormal mode I is displayed to indicate gas leakage. Otherwise, the program proceeds to the point 468 where the indication of the abnormal mode I, II, III or IV is released. It is to be noted that this routine may be made in the background job.

Figure 20:
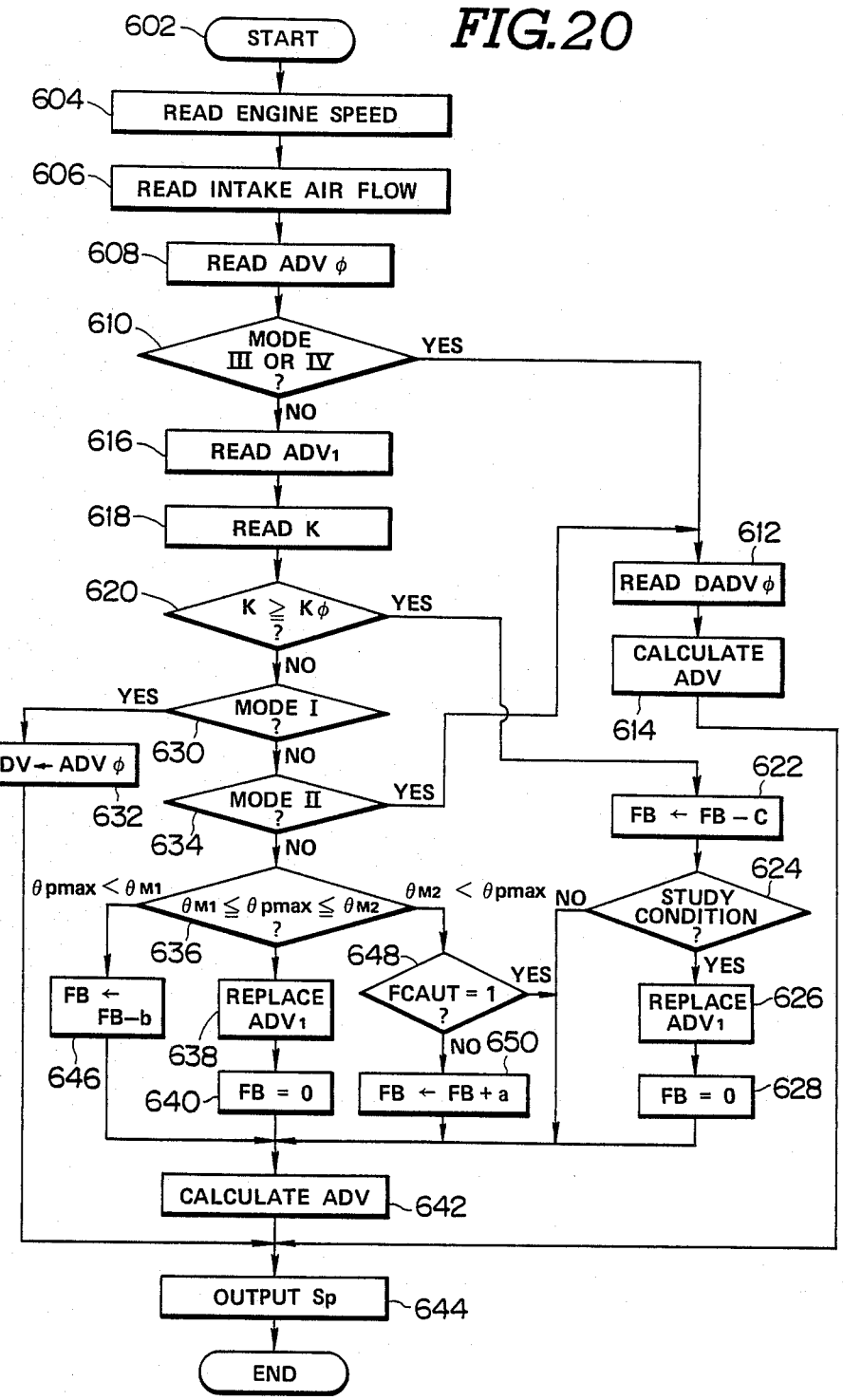
FIG. 20 is a flow diagram illustrating the programming of the digital computer as it is used to calculate a desired value for ignition-system spark-timing.

FIG. 20 is a flow diagram illustrating the programming of the digital computer as it is used to control the ignition-system spark timing.

The computer program is entered at the point 602 at the end of each calculation of a crankshaft position $\theta_{pmax}$ at which the cylinder pressure is at maximum. At the point 604 in the program, the engine speed N is read into the RAM 142 and, at the point 606, the engine intake air flow Qa is read into the RAM 142.

At the point 608 in the program, the digital computer central processing unit 141 looks at a basic value (ADV$\phi$) for ignition-system spark-timing in a look-up table which defines the value ADV$\phi$ as a function of engine speed N and intake air flow Qa, as shown in FIG. 12. At the point 610 in the program, a determination is made as to whether or not the abnormal mode III or IV presents. If the answer to this question is "yes", then it means that any knock information cannot be obtained from the high frequency detonation or knock signal S7. Under this circumstance, the central processing unit 141 calculates a value (ADV) for ignition-system spark-timing from a look-up data prepared for this circumstance while stopping the MBT and knock control in order to avoid combustion aggravation resulting from a spark-timing control based upon unreliable combustion information. For this purpose, the program proceeds to the point 612 where the central processing unit 141 calculates a retard value (DADV$\phi$) suitable for a region where there is a great tendency toward engine knock. This calculation is made by looking at the retard value (DADV$\phi$) in a look-up table which defines this retard value (DADV$\phi$) as a function of engine speed N and fuel-injection pulse-width basic value Tp. Following this the program proceeds to the point 614 where the central processing unit 141 calculates an eventual value (ADV) for ignition-system spark timing as $ADV = ADV\phi - DADV\phi$. After this calculation, the program proceeds to the point 644 where the calculated value (ADV) is outputted to the spark timing control circuit.

If the answer to the question inputted at the point 610 is "no", then the program proceeds to the point 616 where the digital computer central processing unit 141 looks at a spark-timing correction factor (ADV1) in a look-up table which defines the correction factor (ADV1) as a function of engine speed N and intake air flow Qa. The look-up data are obtained experimentally and stored in the NVM 146 during the execution of the main routine. At the point 618 in the program, the output signal S7 of the high frequency detector circuit 120 is converted to digital form by the analog-to-digital converter and read it into the RAM 142. The read digital value K corresponds to the knock induced vibration level. At the point 620, a determination is made as to whether or not the read value K is equal to or greater than a predetermined slice level K$\phi$. If the answer to this question is "yes", then it means that engine knock occurs. Under this circumstance, a knock control is required to retard the ignition-system spark-timing at a predetermined rate until the engine knock disappears. For this purpose, the program proceeds to the point 622 where the feedback correction factor FB is reduced to a value FB - c in order to retard the spark timing so as to suppress engine knock. Following this, at the point 624 in the program, a determination is made as to whether or not a study condition establishes. If the answer to this question is "yes", then it means that the engine operating conditions are not transient and suitable for accumulation of look-up data and the program proceeds to the point 626 where the new value (ADV1) replaces the old value. Following this, the program proceeds to the point 628 where the feedback correction factor FB is reduced to zero and then to the point 642 where a value (ADV) is calculated for ignition-system spark-timing as $ADV = ADV\phi + ADV1 + FB$. If the answer to the question inputted at the point 624 is "no", then the program proceeds directly to the point 642. At the point 644 in the porgram, the calculated value (ADV) is outputted to the spark timing control circuit.

If the answer to the question inputted to the point 620 in "no", then it means that no engine knock occurs and the program proceeds to the point 630 where a determination is made as to whether or not the abnormal mode I presents. If the answer to this question is "yes", then it means that gas leakage occurs and the center processing unit looks at a value for ignition-system spark-timing in a look-up table while stopping the MBT control. For this purpose, the program proceeds to the point 632 where the central processing unit 141 takes the basic value (ADV$\phi$) for an eventual value (ADV) for the ignition-system spark-timing and then to the point 644 where the eventual value (ADV$\phi$) is outputted to the spark timing control circuit.

If the answer to the question inputted at the point 630 is "no", then the program proceeds to the point 634 where a determination is made as to whether or not the abnormal mode II presents. It the answer to this question is "yes", then it means that the electric resistance of the signal line increases for any of reasons and the central processing unit calculates a value (ADV) for ignition-system spark-timing from a look-up data prepared for this circumstance while stopping the MBT and knock control in order to avoid combustion aggravation resulting from a spark-timing control based upon unreliable combustion information. For this purpose, the program proceeds to the point 612.

If the answer to the question inputted at the point 634 is "no", then it means that the sensor signal is reliable and the program proceeds to perform the MBT control. For this purpose, the program proceeds to the determination point 636. This determination is as to whether or not the crankshaft angle $\theta_{pmax}$ is equal to or greater than a first reference value $\theta_{M1}$ or equal to or smaller than a second, greater reference value $\theta_{M2}$. If $\theta_{M1} \leq \theta_{pmax} \leq \theta_{M2}$, then it means that the present correction factor is suitable for ignition-system spark-timing control and the program proceeds to the point 638 where the new value (ADV1) replaces the old value and then to the point 640 where the correction factor FB is set at zero. Following this, the program proceeds to the point 642 where the central processing unit calculates an optimum value for ignition-system spark-timing as $ADV=ADV\phi+ADV1+FB$. The calculated value is outputted to the spark timing control circuit at the point 644.

If $\theta_{pmax}<\theta_{M1}$, then its means that the spark timing is advanced to an excessive degree and the program proceeds to the point 646 where the MBT control feedback correction factor FB is reduced to FB−b. Following this, the program proceeds to the point 642 where an optimum value (ADV) is calculated for ignition-system spark-timing. The calculated value (ADV) is outputted to the spark timing control circuit at the point 644.

If $\theta_{M2}<\theta_{pmax}$ at the determination point 636, then it means that the spark timing is retarded to an excessive degress and the program proceeds to the point 648 where a determination is made as to whether or not the caution flag FCAUT is set. If the answer to this question is "no", then the program proceeds to the point 650 where the feedback correction factor FB is increased to FB+a and then to the point 642 where an optimum value (ADV) is calculated for ignition-system spark-timing. Otherwise, the program porceeds from the point 648 directly to the point 642. The calculated value (ADV) is outputted to the spark timing control circuit at the point 644.

Such a control is made for each of the cylinders. While in the exemplification of the invention, the apparatus was intended for use in a four-stroke, four-cylinder engine, it will be appreciated that the apparatus can be used with other types of engines. In addition, while the invention has been described in connection with ignition-system spark-timing control, it will be appreciated that it is also equally applicable to other engine controls including fuel injection control, EGR valve position control, and the like.

It is, therefore, apparent from the foregoing that there has been provided, in accordance with the invention, an apparatus which can provide a failure indicate of the sensor signal being unreliable for use in controlling the engine. Upon the occurrence of the failure indication, the engine is controlled independently of the sensor signal. In addition, the inventive apparatus can provide an indication of a cause of the failure indication.

What is claimed is:

1. An apparatus for monitoring cylinder combustion in an internal combustion engine having at least one cylinder to control said engine, comprising:

sensor means sensitive to combustion pressure in said cylinder for providing a sensor signal indicative of a sensed cylinder combustion pressure level;

means coupled through a signal line to said sensor means for extracting, from said sensor signal, a knock signal in a predetermined high frequency range and a cylinder combustion pressure signal in a predetermined low frequency range;

a circuit responsive to said high frequency knock signal and said low frequency cylinder combustion pressure signal for providing a failure indication of said sensor signal being unreliable for use in controlling said engine, said circuit including first decision means responsive to an abnormal condition of said high frequency knock signal for providing a first indication, second decision means responsive to an abnormal condition of said low frequency cylinder combustion pressure signal for providing a second indication, and means for providing said failure indication based upon said first and second indications; and means responsive to said failure indication for controlling said engine independently of said sensor signal.

2. An apparatus for monitoring cylinder combustion in an internal combustion engine having at least one cylinder to control said engine, comprising;

sensor means sensitive to combustion pressure in said cylinder for providing a sensor signal indicative of a sensed cylinder combustion pressure level;

means coupled through a signal line to said sensor means for extracting, from said sensor signal, a knock signal in a predetermined high frequency range and a cylinder combustion pressure signal in a predetermined low frequency range;

a circuit responsive to said high frequency knock signal and said low frequency cylinder combustion pressure signal for providing a failure indication of said sensor signal being unreliable for use in controlling said engine, said circuit including first decision means responsive to an abnormal condition of said high frequency knock signal for providing a first indication, second decision means responsive to an abnormal condition of said low frequency cylinder combustion pressure signal for providing a second indication, and means for providing said failure indication based upon said first and second indications;

means to responsive to said failure indication for controlling said engine independently of said sensor signal; and said first decision means includes means for sampling a predetermined number of values of said high frequency knock signal at predetermined intervals, means for calculating a variance of said sampled values each time a new value is sampled, means for comparing said calculated variance with a reference value, means for providing a caution indication in response to said calculated variance smaller than said reference value, and means for providing said first indication in response to said caution indication held for a period greater than a predetermined value.

3. The apparatus as claimed in claim 2, wherein said reference value is determined as a function of engine speed.

4. The apparatus as claimed in claim 2, wherein said second decision means includes means for sampling a value of said low frequency cylinder combustion pressure signal at piston top dead center, means comparing said sampled value with a reference value, and means for providing said second indication in response to said sampled value smaller than said reference value.

5. The apparatus as claimed in claim 4, wherein said reference value is determined as a function of engine speed and air flow to said engine.

6. The apparatus as claimed in claim 2, wherein said circuit includes means responsive to said first and second indications for providing said failure indication and an indication of an open or short circuit in said signal line.

7. The apparatus as claimed in claim 2, wherein said sensor means is secured to a cylinder head by a spark plug secured in a hole formed in said cylinder head, and wherein said circuit includes means for providing said failure indication and an indication of gas leakage from said cylinder through said hole in response to said second indication in the absence of said first indication.

8. The apparatus as claimed in claim 2, wherein said second decision means includes means for sampling a predetermined value of said low frequency cylinder combustion pressure signal, means for calculating a symmetric difference from the sampled value, means for comparing said calculated symmetric difference with a reference value, and means for providing a misfire indication in response to said calculated symmetric difference smaller than said reference value.

9. The apparatus as claimed in claim 8, wherein said circuit includes means for providing said failure indication and an indication of an increased electrical resistance of said signal line in response to said first indication in the absence of said second and misfire indications.

10. The apparatus as claimed in claim 8, wherein said circuit includes means for providing said failure indication and an indication of misfire in said cylinder in response to said frist and misfire indications in the absence of said second indication.

11. The apparatus as claimed in claim 8, wherein said circuit includes means for providing said failure signal in response to said first indication in the absence of said second and misfire indications, in response to said first and misfire indications in the absence of said second indication, in response to said first and second indications, or in response to said second indication in the absence of said first indication.

12. The apparatus as claimed in claim 8, wherein said sensor means is secured to a cylinder head by a spark plug secured in a hole formed in said cylinder head, and wherein said circuit includes means for providing an indication of an open or short circuit in said signal line in response to said second indication in the absence of said first indication, an indication of an increased electric resistance of said signal line in response to said first indication in the absence of said second and misfire indications, and an indication of misfire in said cylinder in response to said first and misfire indications in the absence of said second indication.

* * * * *